United States Patent
Ahuja et al.

(10) Patent No.: US 7,650,606 B2
(45) Date of Patent: Jan. 19, 2010

(54) SYSTEM RECOVERY

(75) Inventors: Pratima Ahuja, Foster City, CA (US); Ramani Mathrubutham, Milpitas, CA (US); Adwait Sathye, Sunnyvale, CA (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 10/768,328

(22) Filed: Jan. 30, 2004

(65) Prior Publication Data

US 2005/0172288 A1 Aug. 4, 2005

(51) Int. Cl.
G06F 9/46 (2006.01)
G06F 11/00 (2006.01)
G06F 12/00 (2006.01)
G06Q 40/00 (2006.01)

(52) U.S. Cl. ............ 718/106; 718/100; 714/2; 714/10; 714/16; 705/7; 705/8; 705/39; 705/41; 707/203; 707/204

(58) Field of Classification Search .......... 718/101, 718/100, 106; 714/2, 10, 16; 707/203–204; 705/7–8, 39, 41
See application file for complete search history.

(56) References Cited

U.S. PATENT DOCUMENTS

| 4,648,031 A * | 3/1987 | Jenner ............... 714/10 |
| 4,703,481 A | 10/1987 | Fremont |
| 4,878,167 A * | 10/1989 | Kapulka et al. ............... 714/16 |
| 5,410,672 A | 4/1995 | Sodek, Jr. et al. |
| 5,440,691 A | 8/1995 | Carrafiello et al. |
| 5,566,337 A | 10/1996 | Szymanski et al. |
| 5,692,156 A | 11/1997 | Bahls et al. |
| 5,712,971 A * | 1/1998 | Stanfill et al. ............... 714/34 |
| 5,870,605 A | 2/1999 | Bracho et al. |
| 5,938,775 A | 8/1999 | Damani et al. |
| 6,014,673 A | 1/2000 | Davis et al. |
| 6,044,419 A | 3/2000 | Hayek et al. |
| 6,070,202 A | 5/2000 | Minkoff et al. |

(Continued)

FOREIGN PATENT DOCUMENTS

GB 2354913 A 4/2001

(Continued)

OTHER PUBLICATIONS

U.S. Patent Application entitled *Method, System, and Program for Buffering Work Requests*, by R. Mathrubutham, A.B. Sathye and C. Zou, filed on Jan. 30, 2004.

(Continued)

Primary Examiner—Lewis A Bullock, Jr.
Assistant Examiner—Jennifer N To
(74) Attorney, Agent, or Firm—Janaki K. Davda; Konrad Raynes & Victor LLP

(57) ABSTRACT

Disclosed is a technique for system recovery. Information identifying one or more work requests is retrieved, along with an order of the work requests, for a business process. If the business process is non-transactional, an in-memory structure is created for the business process, a recovery stub is created for each work request, and the recovery stub for each work request is placed into the in-memory structure based on the order.

24 Claims, 11 Drawing Sheets

U.S. PATENT DOCUMENTS

| | | | |
|---|---|---|---|
| 6,182,086 B1 * | 1/2001 | Lomet et al. | 707/202 |
| 6,285,601 B1 | 9/2001 | Smith | |
| 6,292,856 B1 | 9/2001 | Marcotte | |
| 6,308,237 B1 | 10/2001 | Strongin et al. | |
| 6,321,234 B1 * | 11/2001 | Debrunner | 707/202 |
| 6,336,119 B1 | 1/2002 | Banavar et al. | |
| 6,351,780 B1 | 2/2002 | Ecclesine | |
| 6,493,826 B1 * | 12/2002 | Schofield et al. | 726/22 |
| 6,839,817 B2 | 1/2005 | Hyde, II et al. | |
| 6,898,609 B2 * | 5/2005 | Kerwin | 707/203 |
| 6,970,921 B1 | 11/2005 | Wang et al. | |
| 7,017,020 B2 | 3/2006 | Herbst et al. | |
| 7,130,957 B2 | 10/2006 | Rao | |
| 7,210,001 B2 | 4/2007 | Frey et al. | |
| 2002/0116404 A1 * | 8/2002 | Cha et al. | 707/202 |
| 2002/0161859 A1 * | 10/2002 | Willcox et al. | 709/219 |
| 2002/0194244 A1 * | 12/2002 | Raventos | 709/101 |
| 2004/0215998 A1 * | 10/2004 | Buxton et al. | 714/2 |
| 2006/0004649 A1 * | 1/2006 | Singh | 705/37 |

FOREIGN PATENT DOCUMENTS

| | | |
|---|---|---|
| JP | 2000332792 A | 11/2000 |
| SU | 491980 | 2/1976 |

OTHER PUBLICATIONS

U.S. Patent Application entitled "*Method, System, and Program for Facilitating Flow Control,*" by R. Mathrubutham, A.B. Sathye and C. Zou, filed on Jan. 30, 2004.

U.S. Appl. No. 12/047,238, filed Mar. 12, 2008, entitled "System and Program for Buffering Work Requests", invented by R. Mathrubutham, A.B. Sathye, and C. Zou, 36 pp.

* cited by examiner

SYSTEM RECOVERY

BACKGROUND OF THE INVENTION

1. Field of the Invention

The present invention is related to system recovery.

2. Description of the Related Art

The term "workflow" may be used to describe tasks and data for business processes. The data, for example, may relate to organizations or people involved in a business process and required input and output information for the business process: A workflow automation product allows creation of a workflow model to manage business processes. A workflow engine is a component in a workflow automation program that understands the tasks of each business process in the workflow and determines whether the business process is ready to move to the next task.

An enterprise may be any organization (e.g., private company, government unit, etc.) that uses computers. Enterprise Application Integration (EAI) may be used to describe techniques and tools aimed at consolidating and coordinating computer applications in an enterprise. Typically, an enterprise has existing legacy applications and data stores and wants to continue to use them while adding or migrating to a new set of applications. EAI may involve determining how existing applications and new applications will fit together.

Recovering a system, such as a server computer, after failure is a critical part of a software application. In some systems, a sequential log of work requests is maintained in a persistent data store, and, for recovery, the work requests in the log are re-executed to arrive at a consistent state. A work request may be described as a business object request because the work request is processed by a business process. For example, a work request may provide data (e.g., employee name and social security number) and a description of what is to be done (e.g., creating, deleting, or updating an entry in a data store).

In some systems, a system state is stored in a persistent data store, and recovery of a system is performed by reading the system state and completely re-initializing the system using the saved system state. During such recovery, the system is not available for other processing.

In some systems, such as workflow engines or EAI servers, where business processes run for a long period of time, it may not be feasible to implement a solution that re-executes all work requests in a log or that re-initializes system state from a stored system state as these recovery solutions may take too long to execute and may not make the system available as quickly as desired.

Thus, there is a need in the art for an improved recovery solutions.

SUMMARY OF THE INVENTION

Provided are a method, system, and program for system recovery. Information identifying one or more work requests is retrieved, along with an order of the work requests, for a business process. If the business process is non-transactional, an in-memory structure is created for the business process, a recovery stub is created for each work request, and the recovery stub for each work request is placed into the in-memory structure based on the order.

Also provided are a method, system, and program for system recovery in which, if the business process is transactional, an in-memory structure is created for the business process, a recovery stub is created for each work request that indicates that rollback is to be performed, and the recovery stub is placed for each work request into the in-memory structure based on the order.

Furthermore, provided are a method, system, and program for system recovery in which, if the business process is transactional, a rollback is performed for each work request, and an in-memory structure is created for the business process.

In yet further implementations, new work requests are accepted in the in-memory structure after processing each of the one or more identified work requests for both transactional and non-transactional business processes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention logically reconstruct system state during recovery of system. Logical reconstruction refers to creation of a consistent system state as it was before a failure such that new work requests may be accepted without completing some or all work requests that are to be recovered.

Figure 1A:
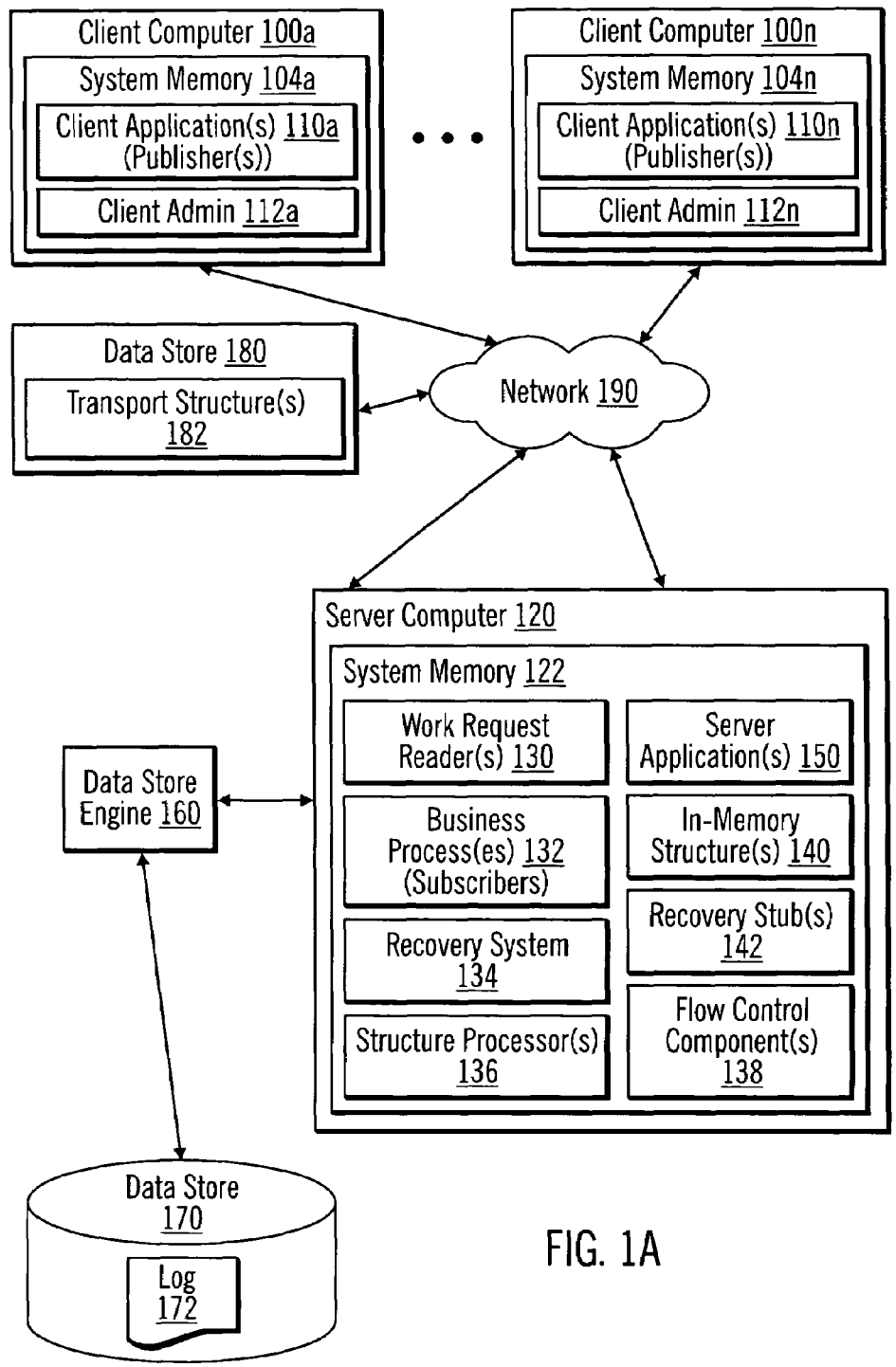
FIG. 1A illustrates, in a block diagram, a computing environment in accordance with certain implementations of the invention.

FIG. 1A illustrates, in a block diagram, a computing environment in accordance with certain implementations of the invention. One or more client computers 100a . . . 100n are connected via a network 190 to a server computer 120. For ease of reference, the designations of "a" and "n" after reference numbers (e.g., 100a . . . 100n) are used to indicate one or more elements (e.g., client computers). The client computers 100a ... 100n may comprise any computing device known in the art, such as a server, mainframe, workstation, personal computer, hand held computer, laptop telephony device, network appliance, etc. The network 190 may comprise any type of network, such as, for example, a Storage Area Network (SAN), a Source Area Network (LAN), Wide Area Network (WAN), the Internet, an Intranet, etc.

Each client computer 100a ... 100n includes system memory 104a ... 104n, respectively, which may be implemented in volatile and/or non-volatile devices. One or more client applications 110a ... 110n and client admin applications 112a ... 112n may execute in the system memory 104a ... 104n, respectively. The client applications 110a ... 110n may generate and submit work requests in the form of messages to the server computer 120 for execution. The client admin applications 112a ... 112n perform administrative functions.

The server computer 120 includes system memory 122, which may be implemented in volatile and/or non-volatile devices. A data store engine 160 is connected to the server computer 120 and to data store 170.

One or more work request readers 130, one or more business processes 132, a recovery system 134, one or more structure processors 136, and one or more flow control components 138 execute in the system memory 122. Additionally, one or more server applications 150 execute in system memory 122. One or more in-memory structures 140 (e.g., in-memory queues) may be stored in system memory 122. In certain implementations of the invention, there is one in-memory structure 140 associated with each business processes 132, and one structure processor 136 associated with each in-memory structure 140.

One or more transport structures 182 (e.g., queues) may be stored in a data store 180 connected to network 190. In certain implementations of the invention, there is one transport structure 182 associated with each business process 132. The transport structure 182 may be, for example, a Message Queue ("MQ") available from International Business Machines Corporation, a Common Object Request Broker Architecture (CORBA) structure, or a JAVA® Message Service (JMS) structure. In certain implementations of the invention, the transport structure 182 may be persistent.

In certain implementations of the invention, such as in workflow systems, the client applications 110a ... 110n may be described as "publishers", while the business processes 132 may be described as "subscribers".

The work requests may be stored in both in-memory structures 140 and in transport structures 182 corresponding to the business processes 132 that are to process the work requests. The work request reader 130 retrieves a work request from a transport structure 182 associated with a business process 132 that is to execute the work request, and forwards the work request to the appropriate business process 132.

During recovery, recovery stubs 142 are generated in system memory 122 by retrieving some data from log 172. In certain implementations of the invention, the term "recovery stubs" 142 may be used to represent a portion of a work request. In certain implementations of the invention, a recovery stub includes a work request key that links together work requests (e.g., a social security number for data about an individual), a work request ordering identifier that indicates the order in which the work request corresponding to the recovery stub was received by the work request reader 130, and a structure identifier that provides access to the complete work request stored in one or more transport structures 182. In certain implementations, the work request ordering identifier is a sequence number assigned to the work request. The log 172 provides information about work requests (e.g., a work request key, a work request ordering identifier, and a structure identifier) and the state of the work requests (e.g., whether a work request was in progress when a system failure occurred).

Although a single data store 170 is illustrated for ease of understanding, data in data store 170 may be stored in multiple data stores at server computer 120 and/or other computers connected to server computer 120.

The data store 170 may comprise an array of storage devices, such as Direct Access Storage Devices (DASDs), Just a Bunch of Disks (JBOD), Redundant Array of Independent Disks (RAID), virtualization device, etc.

Figure 1B:
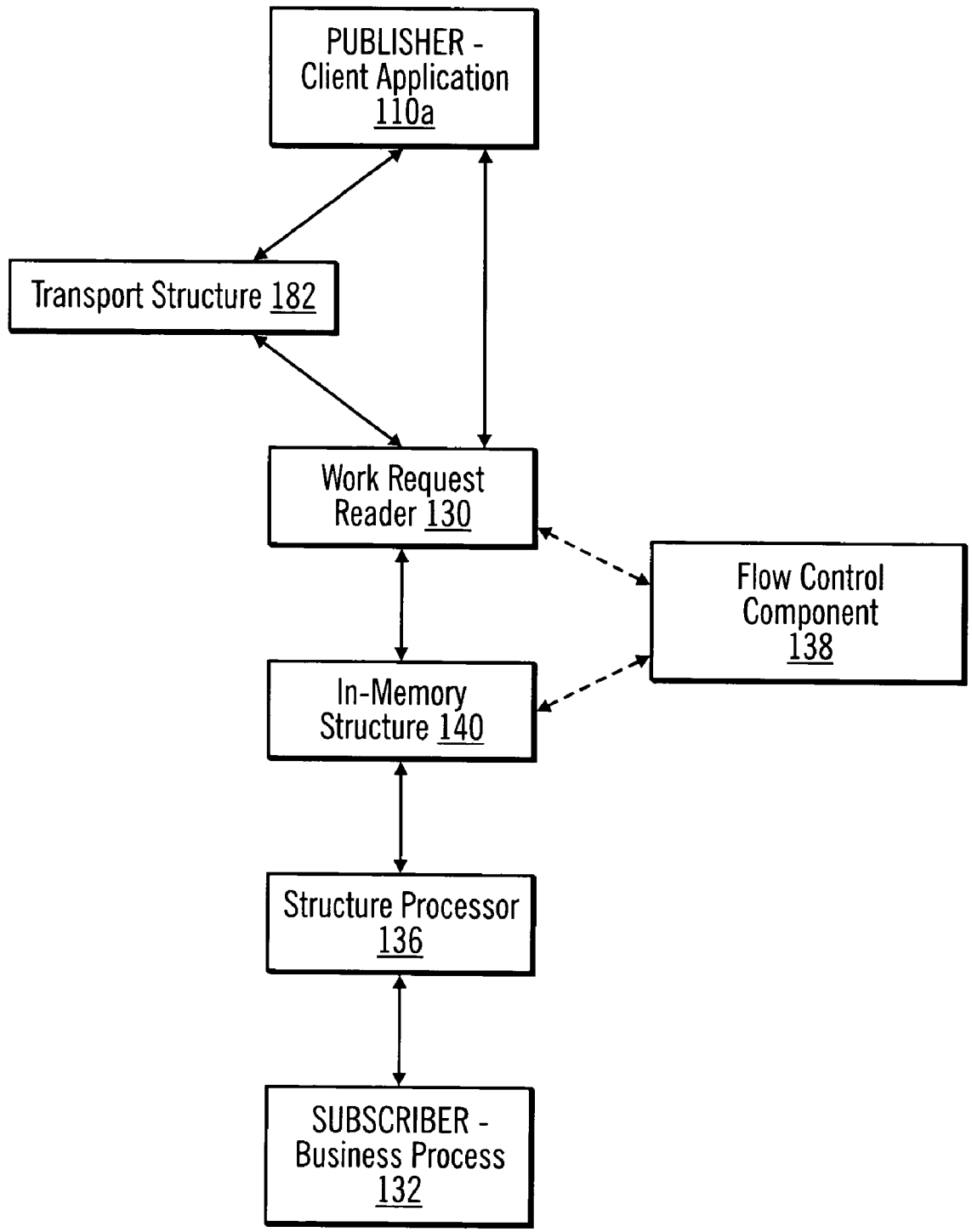
FIG. 1B illustrates, in a block diagram, further details of a computing environment in accordance with certain implementations of the invention.

FIG. 1B illustrates, in a block diagram, further details of a computing environment in accordance with certain implementations of the invention. In certain implementations, one client application 130 ("publisher"), one transport structure 182, one work request reader 130, one in-memory structure 140, one structure processor 136, and one business process 132 ("subscriber") are associated with each other. In certain alternative implementations, a business process 132 may receive work requests from multiple client applications 110.

In the illustration of FIG. 1B, the client application 110a produces work requests that are destined for the business process 132. The client application 110a may also communicate with the work request reader 130, for example, for administrative functions. In particular, the client application 110a sends work requests to the server computer 120 by storing the work requests in transport structures 182, where one transport structure 182 corresponds to one business process 132. The work request reader 130 retrieves work requests from the transport structure 182 and stores them in the in-memory structure 140 for the business process 132. The structure processor 136 retrieves work requests from the in-memory structure 140 and forwards the work requests to the business process 132 for processing. After completing a work request, a business process 132 removes the work request from the appropriate transport structure 182 and performs other processing to clean up the transport structure 182. Additionally, a flow control component 138 monitors work requests being transferred by the work request reader 130 into the in-memory structure 140 and work requests removed from the in-memory structure 140. The flow control component 138 may assist in controlling the flow of work requests.

Figure 1C:
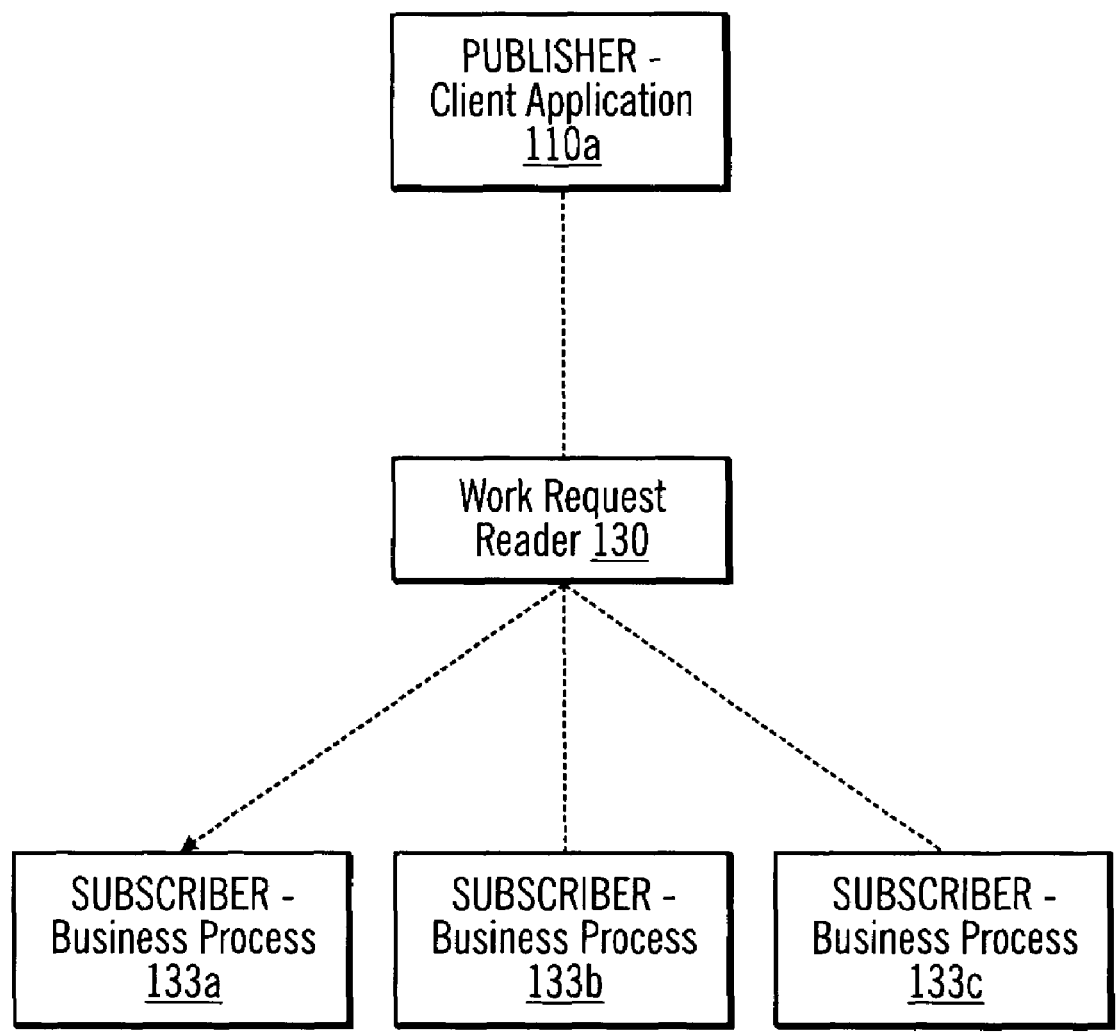
FIG. 1C illustrates, in a block diagram, yet further details of a computing environment in accordance with certain implementations of the invention.

FIG. 1C illustrates, in a block diagram, yet further details of a computing environment in accordance with certain implementations of the invention. In particular, in FIG. 1C, a single client application 110a may send work requests that are processed by a single work request reader 130 for multiple business processes 133a, 133b, 133c.

Figure 2A:
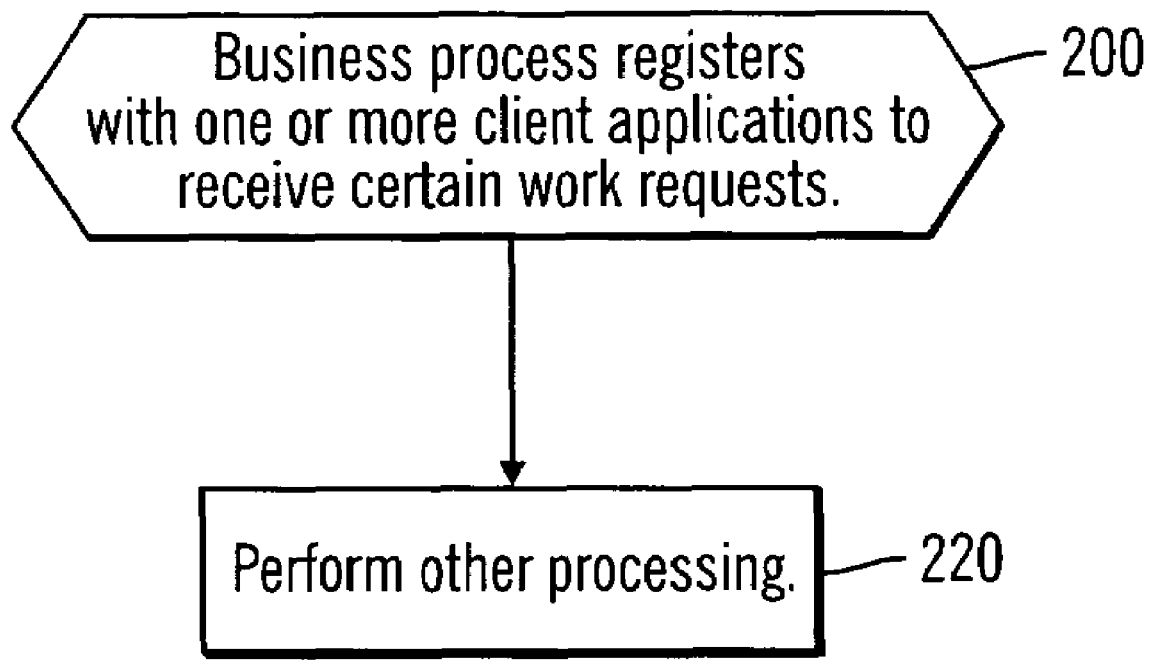
FIG. 2A illustrates logic implemented in a business process in accordance with certain implementations of the invention.

FIG. 2A illustrates logic implemented in a business process 132 in accordance with certain implementations of the invention. Control begins at block 200 with the business process 132 registering with one or more client applications 110a ... 110n for certain types of work requests. In certain implementations, each work request includes a type field. Then, when a work request is generated by a client application 110a ... 110n, the type of the work request is determined, the business processes 132 that registered for that type of work request are determined, and the work request is sent, by the client application 110a ... 110n, to the transport structures 182 for the determined business processes 132. In alternative implementations, work requests and business processes 132 may be associated using other techniques (e.g., all business processes 132 receive all work requests and process the desired ones). In block 220, other processing may occur.

Figure 2B:
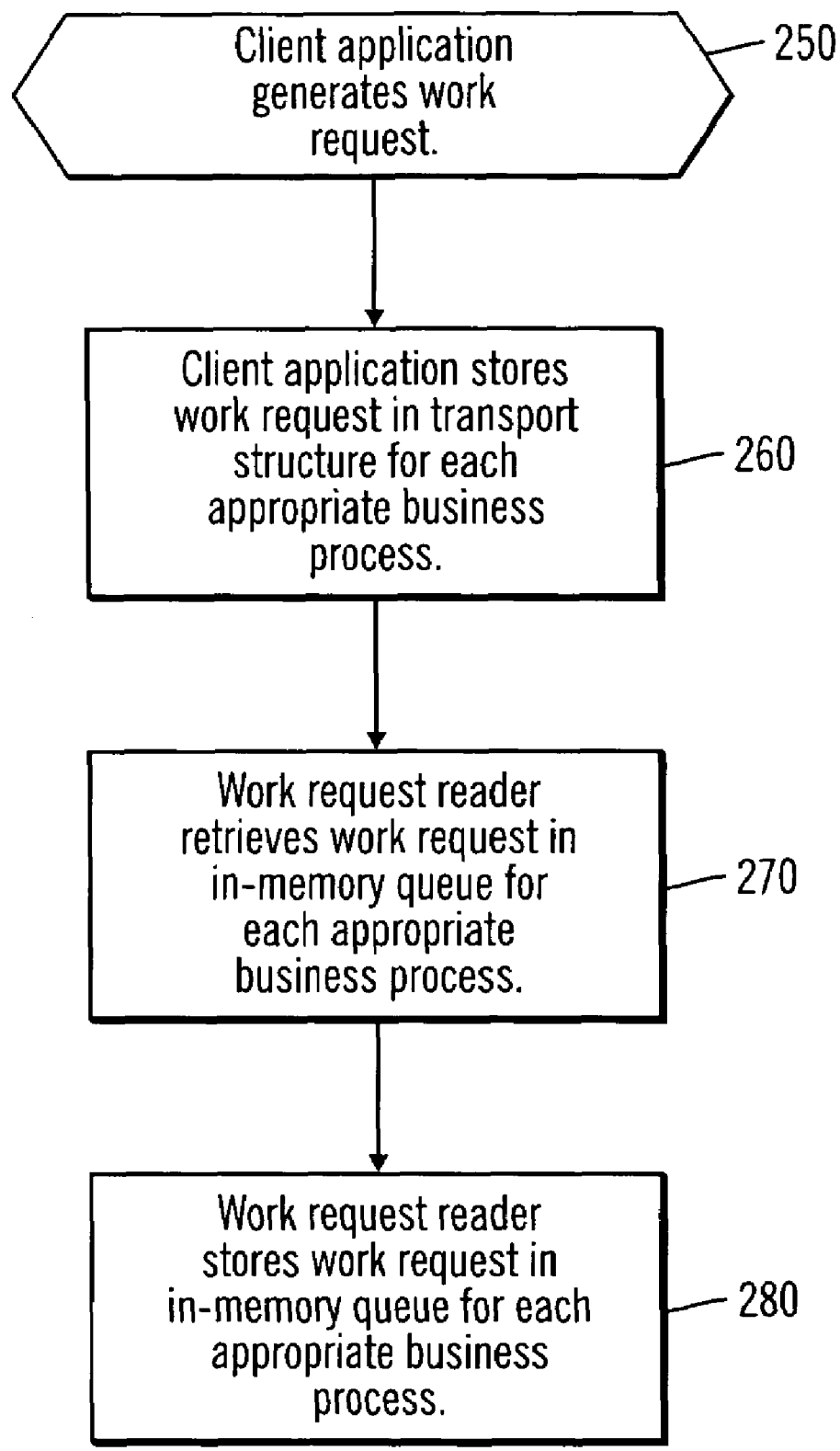
FIG. 2B illustrates logic implemented for moving work requests in accordance with certain implementations of the invention.

FIG. 2B illustrates logic implemented for moving work requests in accordance with certain implementations of the invention. Control begins in block 250 with a client application (e.g., 10a) generating a work request. In block 260, the client application 110a . . . 110n stores the work request in a transport structure 182 for the associated business process 132. If more than one business process 132 is to process the same work request, then the client application 110a . . . 110n stores the work request in the transport structure 182 for each appropriate business process 132. In block 270, the work request reader 130 retrieves the work request from the transport structure 182 for the associated business process. In block 280, the work request reader 130 stores the work request in an in-memory structure 140 for the associated business process 132.

Figure 3A:
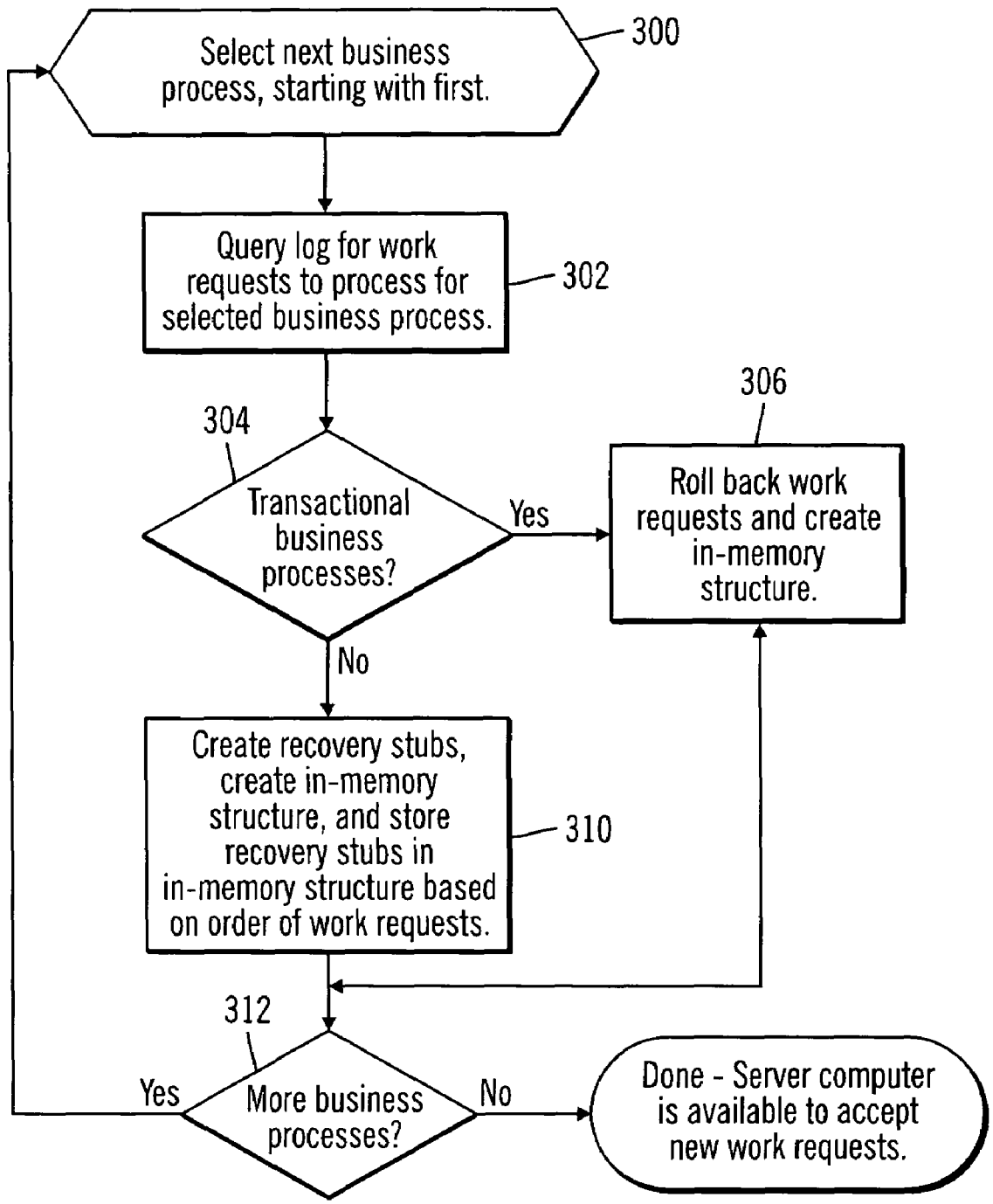
FIG. 3A illustrates logic implemented in a recovery system in accordance with certain implementations of the invention.

FIG. 3A illustrates logic implemented in a recovery system 134 in accordance with certain implementations of the invention. This logic occurs after, for example, a system failure. Control begins at block 300 with selection of the next business process, starting with a first business process. In block 302, the recovery system 134 queries the log 172 for work requests for the selected business process. The query result is a set of work requests, along with the order in which the work requests were received. Statement (1) is a sample pseudocode statement that may be used to query the log for work requests for a business process:

```
SELECT work_requests belonging to business_pro-
    cess_xyz ORDER BY sequence_number          Statement (1)
```

In block 304, the recovery system 134 determines whether the selected business process is a transactional business process 132. A user creating the business process may designate whether the business process is transactional or non-transactional. In certain implementations, for a transactional business process, the log 172 maintains information on which events/tasks of a work request were completed, and a rollback is performed using these events/tasks. In certain implementations, for a non-transactional business process, information is not maintained that would indicate where the work request failed, and, therefore, work requests for non-transactional business processes are re-executed.

If the business process 132 is transactional, processing continues to block 306, otherwise, processing continues to block 310. In block 306, the recovery system 134 rolls back the work requests and creates an in-memory structure 140 for the transactional business process and processing continues to block 312.

If the business process is non-transactional, then, in block 310, the recovery system 134 creates recovery stubs 142, creates an in-memory structure 140, and stores the recovery stubs 142 in the in-memory structure 140 in the order in which the corresponding work requests were received, where one recovery stub corresponds to one work request. In particular, for each work request received from querying the log, the recovery system 134 uses information retrieved from the log to create a recovery stub. In certain implementations of the invention, a recovery stub includes a work request key that links together work requests, a work request ordering identifier that indicates the order in which the work request corresponding to the recovery stub was received by the work request reader 130, and a structure identifier that provides access to the complete work request stored in the transport structure 182 corresponding to the business process.

In block 312, the recovery system 134 determines whether there are more business processes. If so, processing loops back to block 300, otherwise, processing by the recovery system 134 is done and the server computer 120 is available to accept new work requests.

Figure 3B:
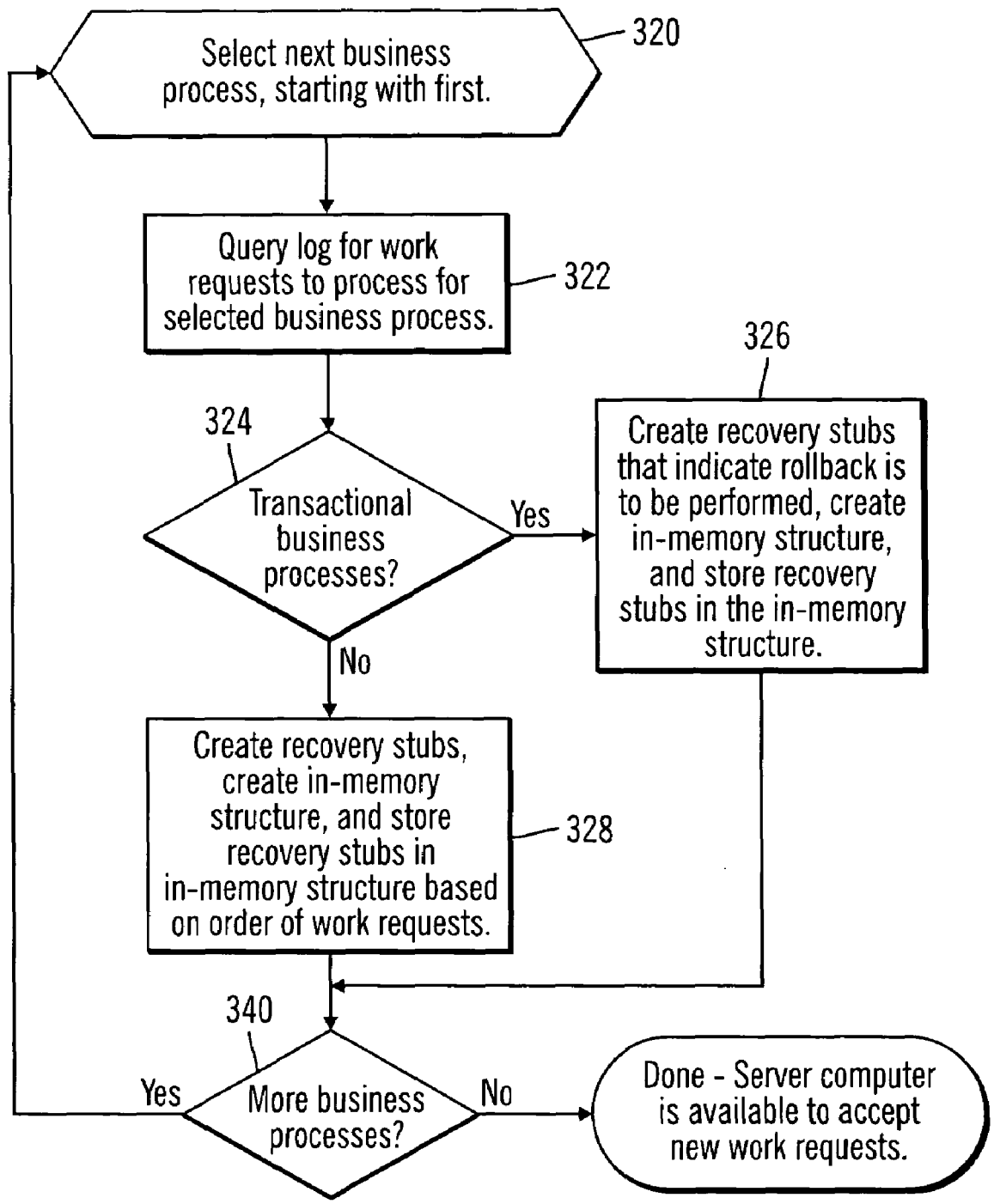
FIG. 3B illustrates logic implemented in a recovery system in accordance with certain alternative implementations of the invention.

FIG. 3B illustrates logic implemented in a recovery system 134 in accordance with certain alternative implementations of the invention. Control begins at block 320 with selection of the next business process, starting with a first business process. In block 322, the recovery system 134 queries the log 172 for work requests for the selected business process. The query result is a set of work requests, along with the order in which the work requests were received.

In block 324, the recovery system 134 determines whether the selected business process is a transactional business process. If so, processing continues to block 326, otherwise, processing continues to block 328. In block 326, the recovery process creates recovery stubs 142 that indicate rollback is to be performed, creates an in-memory structure 140, and stores the recovery stubs 142 in the in-memory structure in the order in which the corresponding work requests were received. In this case, rollback is performed after recovery processing by the recovery system 134 is complete.

If the business process is non-transactional, then, in block 328, the recovery system 134 creates recovery stubs 142, creates an in-memory structure 140, and stores the recovery stubs 142 in the in-memory structure 140 in the order in which the corresponding work requests were received. In block 312, the recovery system 134 determines whether there are more business processes. If so, processing loops back to block 300, otherwise, processing by the recovery system 134 is done and the server computer 120 is available to accept new work requests.

When a server computer 120 crashes, the in-memory structures 140 are lost. However, the log 172 is still available. Therefore, the recovery system 134 is able to create in-memory structures 140 with recovery stubs 142 using data from the log 172.

Figure 3C:
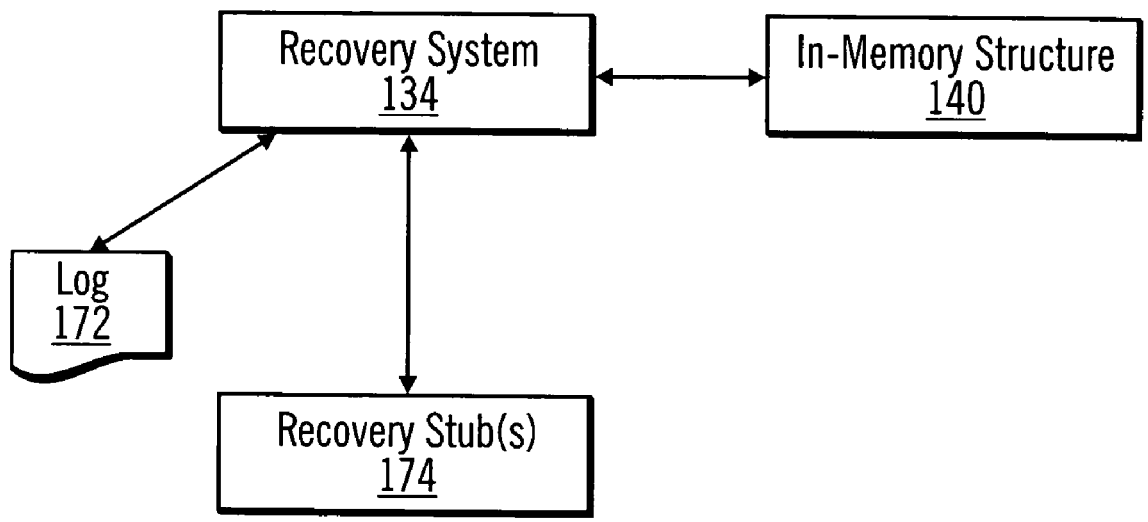
FIG. 3C illustrates interaction of elements of FIG. 1 for recovery in accordance with certain implementations of the invention.

FIG. 3C illustrates interaction of elements of FIG. 1 for recovery in accordance with certain implementations of the invention. For a business process 132, a recovery system 134 queries a log 172 for information to generate recovery stubs 142. The recovery system 134 also creates an in-memory structure 140 for the business process and stores the recovery stubs 142 in the in-memory structure 140.

Figure 4A:
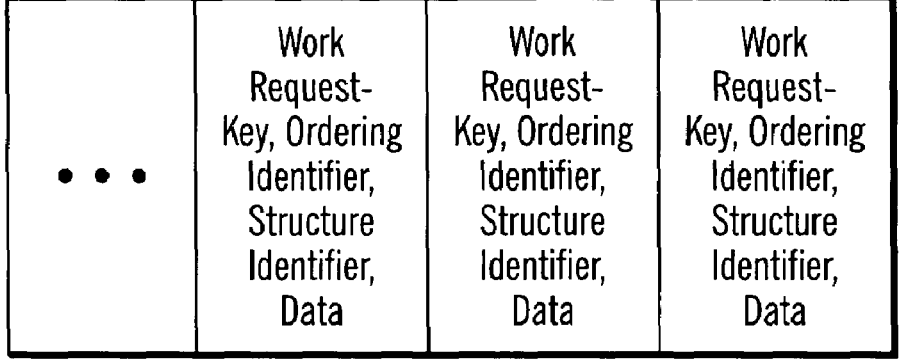
FIGS. 4A and 4B illustrate in-memory structures in accordance with certain implementations of the invention.
Figure 4B:
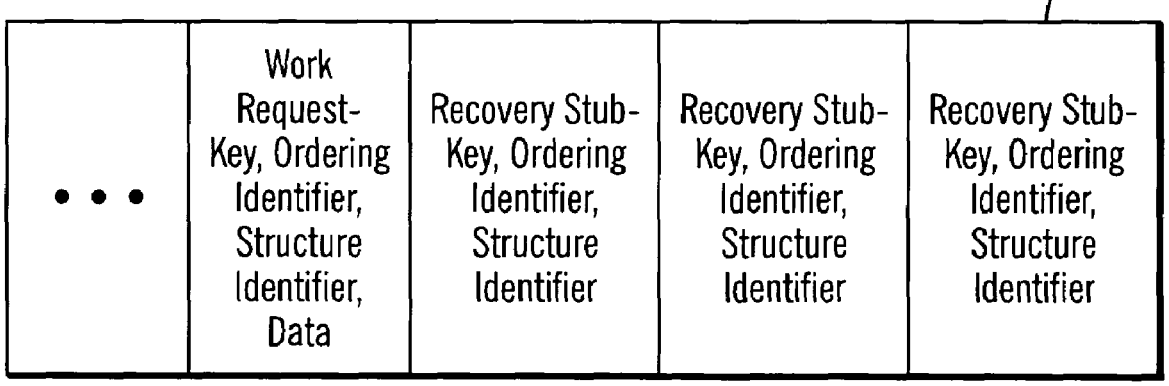

FIGS. 4A and 4B illustrate in-memory structures 400, 410 in accordance with certain implementations of the invention. FIG. 4A illustrates an in-memory structure 400 for a business process 132 before a system failure. The in-memory structure 400 contains three work requests. Each work request includes a work request key that links together work requests (e.g., a social security number for data about an individual), a work request ordering identifier that indicates the order in which the work request was received by the work request reader 130, a structure identifier that provides access to the work request stored in one or more transport structures 182, and data. FIG. 4B illustrates an in-memory structure 410 for the business process 132 after a system has failed and recovery processing is completed. The in-memory structure 410 includes three recovery stubs 142, corresponding to the three work requests in in-memory structure 400. Each recovery stub includes a work request key, a work request ordering identifier, and a structure identifier. Additionally, a new work request is placed in in-memory structure 410 for processing after the recovery stubs 142 are processed. In certain implementations, the recovery stubs 142 do not include data, while work requests do include data.

Figure 5:
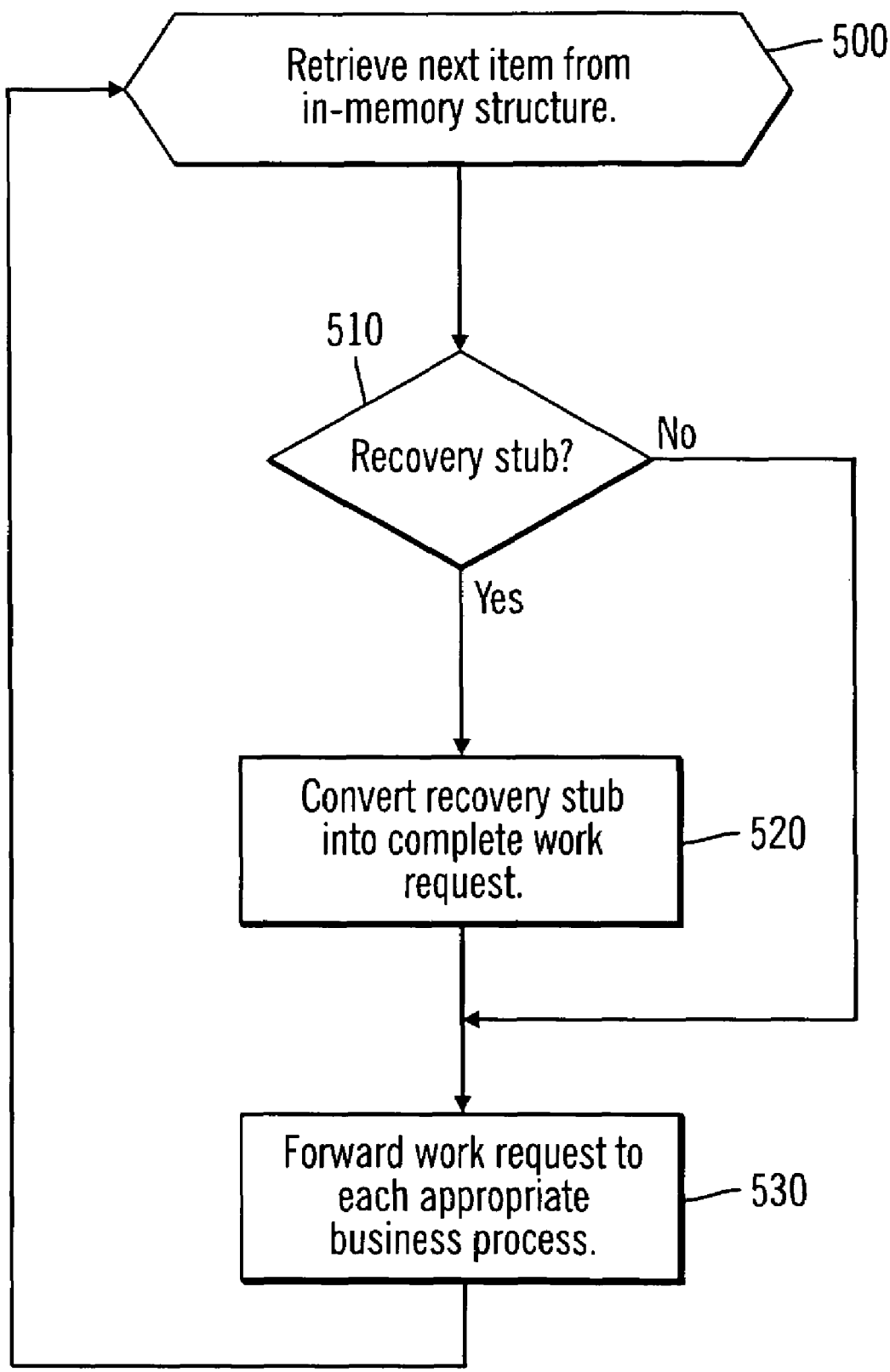
FIG. 5 illustrates logic implemented in a work request reader for processing after recovery in accordance with certain implementations of the invention.

FIG. 5 illustrates logic implemented in a structure processor 136 for processing after recovery in accordance with certain implementations of the invention. Control begins at block 500 with the structure processor 136 retrieving a next item from an in-memory structure 140, starting with a first item. In block 510, the structure processor 136 determines whether the item is a recovery stub. If so, processing continues to block 520, otherwise, processing continues to block 530. In block 520, the structure processor 136 converts the recovery stub into a complete work request by retrieving the complete work request for which the recover stub was created from a transport structure 182. In certain implementations, the work request ordering identifier may be used to locate the complete work request in the transport structure 182. In block 530, the structure processor 136 forwards the complete work request to a business process 132. In certain alternative implementations, the structure processor 136 is called by the business process 132 to retrieve a work request.

Thus, in certain implementations of the invention, as work requests enter the system, a log is maintained in a data store. On recovery, instead of completely re-executing all of the work requests in the log, information in the log is used to logically reconstruct a consistent system state. The re-execution of the work requests in the log may need expensive reconstruction of business work requests and/or execution of long-running/long-lived business processes or may require rolling back the effects of incomplete business transactions. Rather than performing all of this processing before making the system available for new work requests, implementations of the invention mark work requests that failed due to system failure and that are to be recovered as requiring special processing after recovery of the system. These "recovery work requests" (which may also be referred to as "recovery stubs") are constructed using the log and contain enough information so that the work request can be executed successfully during normal runtime processing, without compromising system consistency. The system is then made available for new work requests. The normal runtime system picks up the recovery work requests, as well as new work requests, and processes the recovery work requests as though they are being recovered (e.g., rolling back any incomplete business transactions, rolling forward un-started business transactions, etc.).

JAVA® is a registered trademark or common law mark of Sun Microsystems.

Additional Implementation Details

The described techniques for system recovery may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), hardware component, etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, 3A, 3B, and 5 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, 3A, 3B, and 5 may be implemented in software, hardware, programmable and non-programmable gate array logic or in some combination of hardware, software, or gate array logic.

Figure 6:
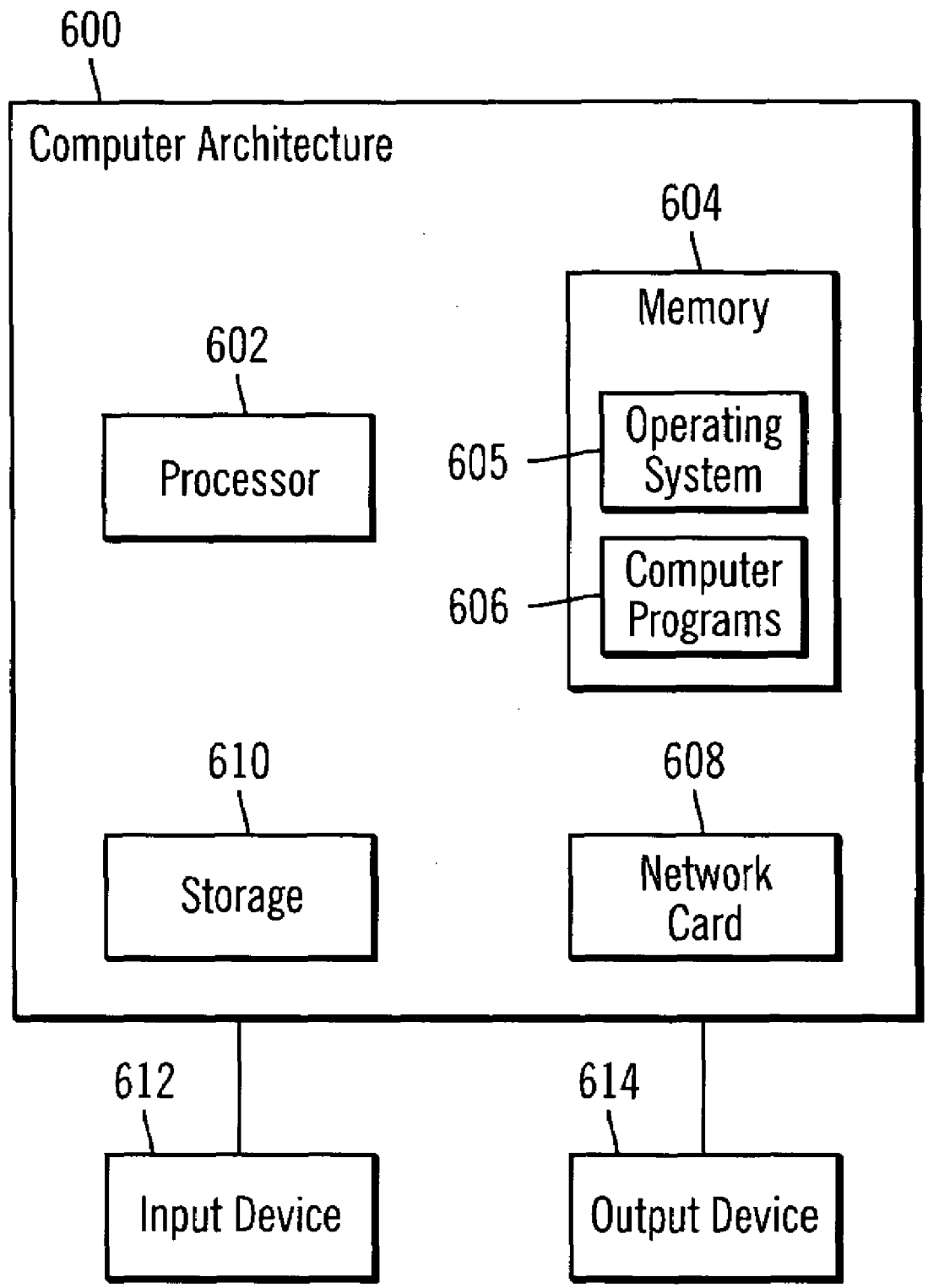
FIG. 6 illustrates an architecture of a computer system that may be used in accordance with certain implementations of the invention.

FIG. 6 illustrates an architecture 600 of a computer system that may be used in accordance with certain implementations of the invention. Client computer 100 and/or server computer 120 may implement computer architecture 600. The computer architecture 600 may implement a processor 602 (e.g., a microprocessor), a memory 604 (e.g., a volatile memory device), and storage 610 (e.g., a non-volatile storage area, such as magnetic disk drives, optical disk drives, a tape drive, etc.). An operating system 605 may execute in memory 604. The storage 610 may comprise an internal storage device or an attached or network accessible storage. Computer programs 606 in storage 610 may be loaded into the memory 604 and executed by the processor 602 in a manner known in the art. The architecture further includes a network card 608 to enable communication with a network. An input device 612 is used to provide user input to the processor 602, and may include a keyboard, mouse, pen-stylus, microphone, touch sensitive display screen, or any other activation or input mechanism known in the art. An output device 614 is capable of rendering information from the processor 602, or other component, such as a display monitor, printer, storage, etc. The computer architecture 600 of the computer systems may include fewer components than illustrated, additional components not illustrated herein, or some combination of the components illustrated and additional components.

The computer architecture 600 may comprise any computing device known in the art, such as a mainframe, server, personal computer, workstation, laptop, handheld computer, telephony device, network appliance, virtualization device, storage controller, etc. Any processor 602 and operating system 605 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for system recovery, comprising:

retrieving information identifying one or more work requests, along with an order in which the work requests were received, for a business process; wherein the information identifying the one or more work requests is retrieved by querying a log determining that the business process is non-transactional, wherein a user creating the business process designates whether the business process is transactional or non-transactional; and in response to determining that the business process is non-transactional, creating an in-memory structure for the business process;

creating a recovery stub for each work request, wherein the recovery stub represents a portion of a corresponding work request and consists of a work request key that links together work requests, a work request ordering identifier that indicates the order in which the work request corresponding to the recovery stub was received, and a structure identifier that provides access to a complete work request stored in one or more transport structures corresponding to the business process; wherein the recovery stub is created using the retrieving information from the log placing the recovery stub for each work request into the in-memory structure based on the order; and for each recovery stub, converting the recovery stub into a complete work request by retrieving the complete work request stored in the one or more transport structures, wherein the work request ordering identifier is used to locate the complete work request stored in the one or more transport structures.

2. The method of claim 1, further comprising:

accepting new work requests in the in-memory structure after processing each of the one or more identified work requests.

3. The method of claim 1, further comprising:

if the business process is transactional, creating an in-memory structure for the business process;

creating a recovery stub for each work request, wherein the recovery stub indicates that rollback is to be performed; and placing the recovery stub for each work request into the in-memory structure based on the order.

4. The method of claim 1, further comprising:

if the business process is transactional, performing a rollback for each work request; and creating an in-memory structure for the business process.

5. The method of claim 4, further comprising:

accepting new work requests in the in-memory structure after processing each of the one or more identified work requests.

6. The method of claim 1, further comprising:

retrieving an item from the in-memory structure; and determining whether the item is the recovery stub.

7. The method of claim 6, wherein new work requests are being simultaneously received.

8. The method of claim 1, wherein the system is logically recovered to a consistent system state without executing the work requests that failed during system failure.

9. A computer readable medium storing a program for system recovery, wherein the program when executed by a processor of a computer causes operations to be performed, the operations comprising:

retrieving information identifying one or more work requests, along with an order in which the work requests were received, for a business process, wherein the information identifying the one or more work requests is retrieved by querying a log;

determining that the business process is non-transactional, wherein a user creating the business process designates whether the business process is transactional or non-transactional; and in response to determining that the business process is non-transactional, creating an in-memory structure for the business process;

creating a recovery stub for each work request, wherein the recovery stub represents a portion of a corresponding work request and consists of a work request key that links together work requests, a work request ordering identifier that indicates the order in which the work request corresponding to the recovery stub was received, and a structure identifier that provides access to a complete work request stored in one or more transport structures corresponding to the business process, wherein the recovery stub is created using the retrieved information from the log;

placing the recovery stub for each work request into the in-memory structure based on the order; and for each recovery stub, converting the recovery stub into a complete work request by retrieving the complete work request stored in the one or more transport structures, wherein the work request ordering identifier is used to locate the complete work request stored in the one or more transport structures.

10. The computer readable medium of claim 9, wherein the operations further comprise:

accepting new work requests in the in-memory structure after processing each of the one or more identified work requests.

11. The computer readable medium of claim 9, wherein the operations further comprise:

if the business process is transactional, creating an in-memory structure for the business process;

creating a recovery stub for each work request, wherein the recovery stub indicates that rollback is to be performed; and placing the recovery stub for each work request into the in-memory structure based on the order.

12. The computer readable medium of claim 9, wherein the operations further comprise:

if the business process is transactional, performing a rollback for each work request; and creating an in-memory structure for the business process.

13. The computer readable medium of claim 12, wherein the operations further comprise:

accepting new work requests in the in-memory structure after processing each of the one or more identified work requests.

14. The computer readable medium of claim 9, wherein the operations further comprise:

retrieving an item from the in-memory structure;

determining whether the item is the recovery stub.

15. The computer readable medium of claim 14, wherein new work requests are being simultaneously received.

16. The computer readable medium of claim 9, wherein the system is logically recovered to a consistent system state without executing the work requests that failed during system failure.

17. A computer system having hardware logic for system recovery, wherein the hardware logic is executed by the computer system, the hardware logic comprising:
retrieving information identifying one or more work requests, along with an order in which the work requests were received, for a business process, wherein the information identifying the one or more work requests is retrieved by querying a log;
determining that the business process is non-transactional, wherein a user creating the business process designates whether the business process is transactional or non-transactional; and
in response to determining that the business process is non-transactional,
creating an in-memory structure for the business process;
creating a recovery stub for each work request, wherein the recovery stub represents a portion of a corresponding work request and consists of a work request key that links together work requests, a work request ordering identifier that indicates the order in which the work request corresponding to the recovery stub was received, and a structure identifier that provides access to a complete work request stored in one or more transport structures corresponding to the business process, wherein the recovery stub is created using the retrieved information from the log;
placing the recovery stub for each work request into the in-memory structure based on the order; and
for each recovery stub, converting the recovery stub into a complete work request by retrieving the complete work request stored in the one or more transport structures, wherein the work request ordering identifier is used to locate the complete work request stored in the one or more transport structures.

18. The computer system of claim 17, further comprising:
accepting new work requests in the in-memory structure after processing each of the one or more identified work requests.

19. The computer system of claim 17, further comprising:
if the business process is transactional,
creating an in-memory structure for the business process;
creating a recovery stub for each work request, wherein the recovery stub indicates that rollback is to be performed; and
placing the recovery stub for each work request into the in-memory structure based on the order.

20. The computer system of claim 17, further comprising:
if the business process is transactional,
performing a rollback for each work request; and
creating an in-memory structure for the business process.

21. The computer system of claim 20, further comprising:
accepting new work requests in the in-memory structure after processing each of the one or more identified work requests.

22. The computer system of claim 17, further comprising:
retrieving an item from the in-memory structure;
determining whether the item is the recovery stub.

23. The computer system of claim 22, wherein new work requests are being simultaneously received.

24. The computer system of claim 17, wherein the system is logically recovered to a consistent system state without executing the work requests that failed during system failure.

* * * * *